United States Patent [19]

Herzig et al.

[11] 4,370,137
[45] Jan. 25, 1983

[54] COIFFURE DEMONSTRATION HEAD MODEL

[75] Inventors: Heinrich G. Herzig, Schwetzingen; Robert Rothfuss, Fellbach, both of Fed. Rep. of Germany

[73] Assignee: Wella Aktiengesellschaft, Darmstadt, Fed. Rep. of Germany

[21] Appl. No.: 286,548

[22] Filed: Jul. 24, 1981

[30] Foreign Application Priority Data

Sep. 1, 1980 [DE] Fed. Rep. of Germany ....... 3032860

[51] Int. Cl.³ .............................................. G09B 25/00
[52] U.S. Cl. ....................................................... 434/94
[58] Field of Search ............... 132/45 R; 434/94, 190; 273/DIG. 30, 423, DIG. 2; 46/DIG. 1

[56] References Cited

U.S. PATENT DOCUMENTS

| | | | |
|---|---|---|---|
| 2,182,296 | 12/1939 | Lowy | 273/423 |
| 2,919,702 | 1/1960 | Olivo | 132/45 R X |
| 3,101,557 | 8/1963 | Watlington | 434/94 |
| 3,187,460 | 6/1965 | Robertson | 273/DIG. 2 |
| 3,339,297 | 9/1967 | Stinn | 434/190 |
| 3,967,823 | 7/1976 | Yount | 273/DIG. 30 |
| 4,051,607 | 10/1977 | Sullivan | 273/DIG. 30 |
| 4,317,462 | 3/1982 | Steiner | 434/94 X |

FOREIGN PATENT DOCUMENTS

| | | | |
|---|---|---|---|
| 1300206 | 6/1962 | France | 46/DIG. 1 |
| 2032785 | 5/1980 | United Kingdom | 273/DIG. 30 |

*Primary Examiner*—Harland S. Skogquist
*Attorney, Agent, or Firm*—Michael J. Striker

[57] ABSTRACT

A demonstration head model for different styles of coiffures includes a head model body and a plurality of pattern elements which are attached to the surface of the model body. The pattern elements may be formed as sheet elements preliminary cut in accordance with a predetermined length and shape corresponding to locks of hair being cut. The pattern elements may also be formed in the form of curlers. By positioning the pattern elements in a predetermined order on a catching band which covers the outer surface of the head model one can receive all the necessary information about the mode of performing a certain hair-cut or hair-setting.

14 Claims, 11 Drawing Figures

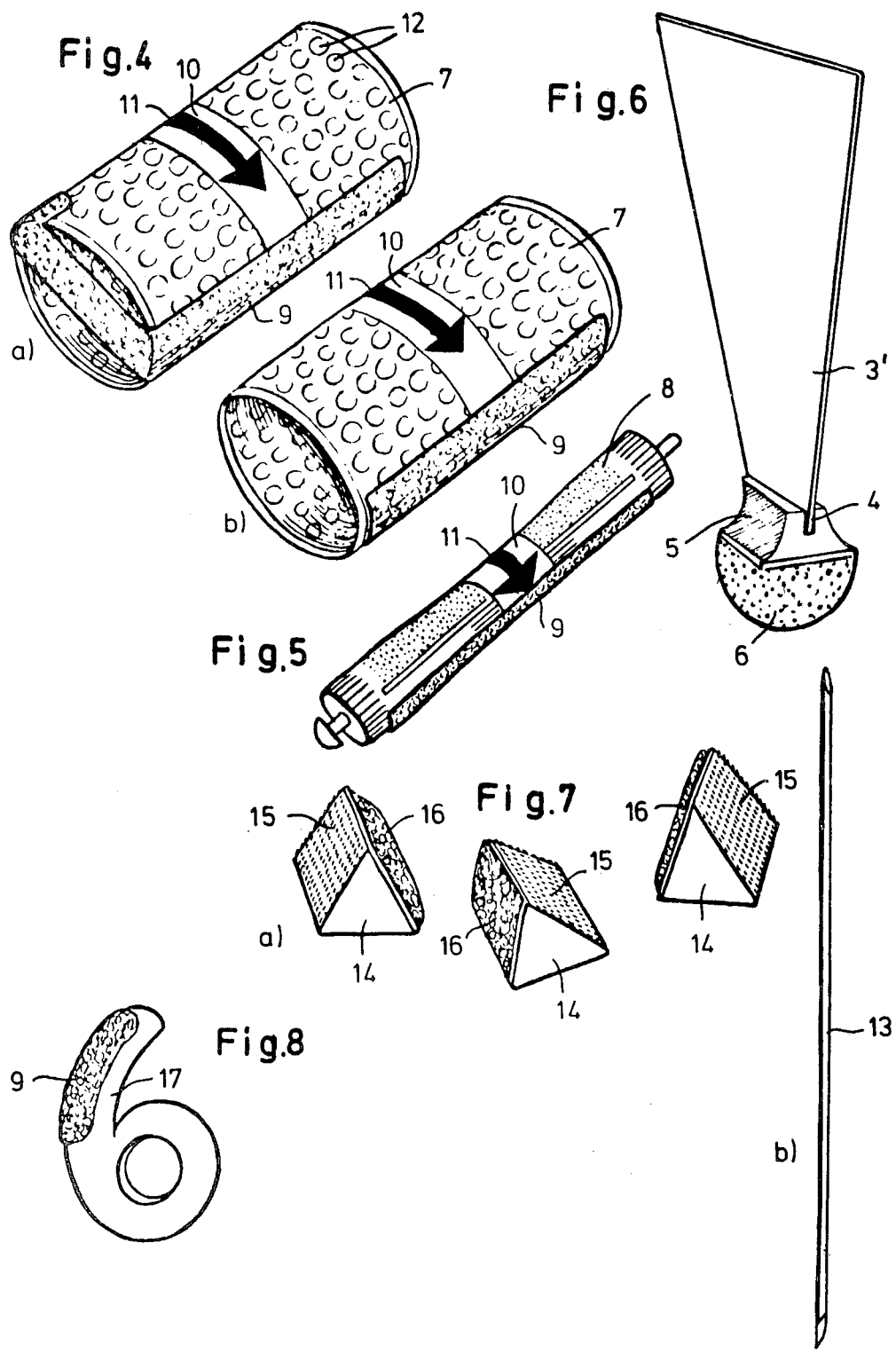

COIFFURE DEMONSTRATION HEAD MODEL

BACKGROUND OF THE INVENTION

The present invention relates to means for demonstration of different styles of coiffures. Such means have been designed to provide one with clear information about necessary working steps for obtaining a certain hair-do. It is known that such steps normally include a hair-cut, or a hair-setting, or any kind of a hair-wave.

The demonstration means of the type under consideration are known. The conventional means normally include graphic representations or schemes. In such schematic representations a number of figures usually show a required length of hair locks to be cut; these graphic illustrations can show only several hair locks, for example hair locks located in the middle area of the hair region of the head. These graphic illustrations depict certain subsequent steps of hair waving, but such illustrations are rather incomplete.

A perspective illustration of the head model has been also suggested in the art. Although the perspective illustration improved the information abilities of flat graphic illustrations this improvement was rather insignificant. These known perspective illustrations have been found improper and insufficient for determining the length of all hair locks to be cut.

The basic disadvantage of graphic illustrations under consideration resides in that they, in general, require that one has certain abilities to draw.

It is also known that wigs placed on a head model are commonly used for demonstration of different styles of coiffures. The wigs, however are usually utilized for illustration of finished coiffures. Of course, the hair-cut and the hair-wave can be demonstrated on the wigs. The wigs, however do not show properly and reliably the steps of performing a hair-do and are thus not suitable for example, for teaching.

SUMMARY OF THE INVENTION

It is an object of the invention to provide an improved means for demonstration of hair-cuts and/or hair-settings.

Another object of the invention is to provide a coiffure demonstration model which provides for complete, three-dimensional and clear illustration of preparation of a predetermined hair-do, which illustration includes required working steps for the hair-cut and/or hair-wave.

Still another object of the invention is to provide a demonstration model which permits one to use the model repeatedly and to easily modify the demonstration model in any required manner.

These and other objects of the invention are attained by a head model for demonstration of coiffures, comprising a head model body having a hair-indicating surface, sticking strips extending over the hair-indicating surface and engaged therewith, and a plurality of pattern elements corresponding to hair locks to be cut and/or set, the pattern elements including pad-like projections which engage with said strips to thereby secure said pattern elements on the head model body.

The pattern elements according to the invention can be easily attached to the adhering strips through a counter pressure applied to the pattern elements and put at any desired place on the head model and in any desired position.

The demonstration head model in accordance with the invention provides one with a stereoscopic and clear information as to how cut and/or wind individual locks of hair. Any subsequent modifications of the arrangement of the pattern elements on the head model can be carried out in a simple manner: the pattern elements can be rearranged on the surface of the head model or interchanged.

Each of the pattern elements may include a sheet portion and a supporting portion provided with the pad-like projection. The supporting portion holds the sheet portion and is provided with a spherically-shaped part carrying the pad-like projection.

By determining the position, length, and shape of the pattern elements one can immediately be informed about cutting of corresponding hair locks in accordance with a predetermined hair-do.

The application of the pattern elements to the surface of the head model, at different required angles, may be significantly facilitated if the support portion of each pattern element includes a spherical surface.

The sheet portion of the pattern element may be interchangeably inserted into the support part of the element. Each sheet portion of the pattern element may be cut to a desired length and shape. The previously used sheet portion may further be cut and used again.

In order to enable one to use an individual demonstration head model repeatedly it is sufficient only to preserve sheet material for the sheet portions of the patterns because all the remaining components of the demonstration model can be utilized repeatedly.

The sheet portions of the pattern elements may be manufactured out of foam sheet material, such as polystyrene. This material has the sufficient stiffness and at the same time is very light so that forces caused by the weight of the pattern elements and exerted on the connection between the adhering strips and pad-like projections of the pattern elements are very small. This material may be easily cut by means of a clipper without affecting its cutting properties.

For demonstration of working steps for a hair-wave the pattern element may include a cylindrical body having an outer surface, said outer surface carrying the pad-like projection.

The cylindrical body may be provided with a marking surface arranged on the periphery of said body and extending transverse of the pad-like projection.

The cylindrical body may be hollow and provided with a plurality of holes distributed over the periphery thereof.

The cylindrical pattern elements represent clear, three-dimensional illustration of steps for performing of hair-wave, which information may be determined in accordance with the positive, size and location of the pattern elements on the surface of the head model. The cylindrical pattern elements are also interchangeable and do not require any modifications of the model itself.

Both types of the pattern elements can be applied to the same head model simultaneously. In this case, for example one half of the head model can serve for the demonstration of a hair-cut whereas the other half can demonstrate the steps of a hair-wave.

The cylindrical pattern element may be provided with a marking needle insertable through the holes formed in the pattern element.

The provision of the cylindrical pattern elements with marking signs enables one to get the information about the directions of winding of the curlers during hair-waving.

The position of the marking needle extending through the holes of the cylindrical pattern element indicates at which angle (obtuse, or acute) to the surface of the model the winding of hair locks should take place.

The demonstration head model according to the invention may further include a plurality of intermediate elements interpositioned between the adhering strips and the pattern elements. Each intermediate element may be formed as a wedge-like piece including an adhering surface and a pad-like surface angularly positioned to the adhering surface. Such intermediate elements make it possible that the pattern elements may be easily placed in the required position by displacing them over the hair-indicating surface.

The demonstration head model may be so arranged that the hair-indicating surface has a middle line; the adhering surface is arranged in rows of strips, two rows of the strips extending transverse of said middle line and away therefrom. At least a number of the rows of strips may extend along a lower edge of the hair-indicating surface and in a circumferential direction approximately corresponding to the circumference of the head model. Such an arrangement makes it possible that the adhering strips can be easily accommodated to the round shape of the head model.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 4a is a perspective view of a cylindrical pattern element of one embodiment;

FIG. 4b is a perspective view of a cylindrical pattern element according to another embodiment;

FIG. 5 is a view of a still another embodiment of a cylindrical pattern element;

FIG. 6 is a perspective view of an individual pattern element for hair-cut, also shown in FIG. 2;

FIG. 7a shows perspective views of intermediate elements to be inserted between the head model and a cylindrical pattern element;

FIG. 7b is a perspective view of a marking needle;

FIG. 8 is a perspective view of a curlpaper; and

DETAILED DESCRIPTION OF THE PREFERRED EMBODIMENTS

Figure 1:
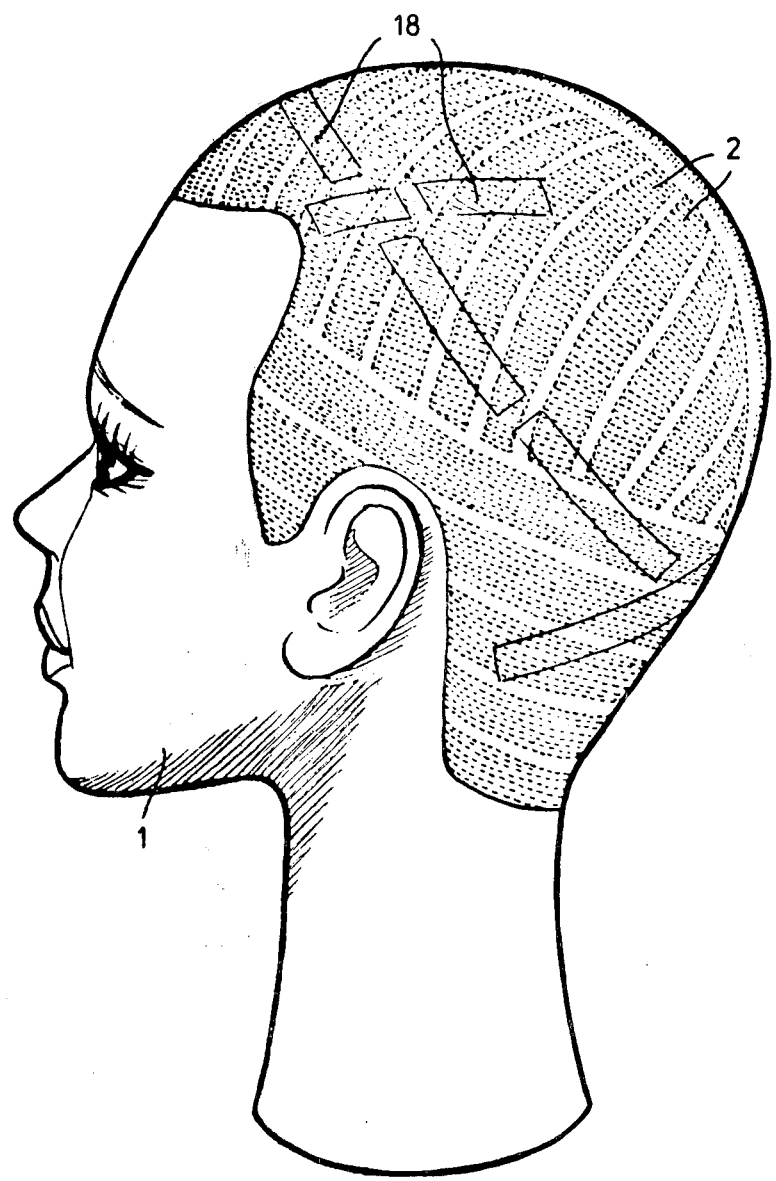
FIG. 1 is a side view of a head model carrying an adhering material thereon.
Figure 2:
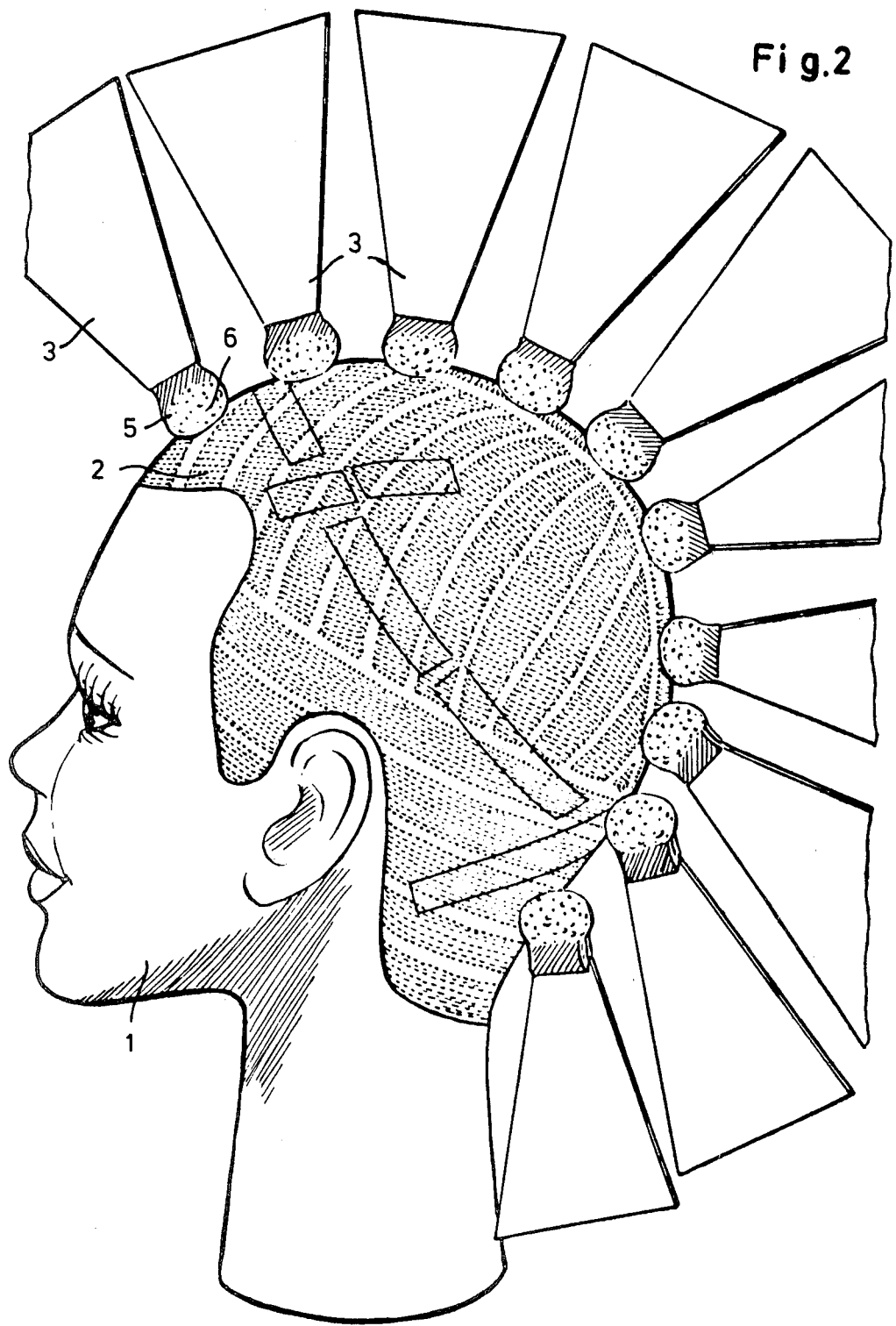
FIG. 2 is a side view of a head model with flag-like pattern elements affixed thereon.
Figure 3:
FIG. 3 is a perspective view of a head model showing an arrangement of cylindrical pattern elements on the head model according to the invention.

Referring now to the drawings, and first to FIGS. 1-3 thereof, a head model denoted as 1, which may be manufactured out of foam polyethylene, foam polystyrene, or any similar material, has an outer surface at region of hair, which surface may be slightly deepened. This surface is provided with a plurality of strips of adhering or burdock-like material 2. The strips are distributed over the upper surface of the model head and secured thereto. A number of pattern elements 3 which correspond to hair locks to be cut during hair-cutting are arranged on the head model. As is clearly seen in FIGS. 2 and 6 the pattern elements 3 have a flag-like configuration. Each individual pattern element 3 includes a flat portion 3' made of sheet material and a support portion which in turn comprises a foot portion 5 with a slot 4 for receiving the flat portion 3' which is usually interchangeable, and a spherically-shaped lower pad-like portion 6.

The pattern elements 3 may be easily engaged with the clinging or adhering strips 2 through the portions 6 by merely applying a pressure on the support portions 5 thereof and sticking them to the strips of the band, and may be easily disengaged from the strips and thus removed from the head model. The flag-shaped sheet portions 3' may have certain length, shape and may be arranged on the head model in a predetermined order to give a user the necessary information about cutting certain hair locks off.

As seen in FIG. 2 the flag-shaped flat elements 3 illustrated herein are arranged on the head model 1 only along a middle line of the model. It is however understood that the entire surface of the model covered with the stitching strips 2 may be provided with the pattern elements 3 to give one the complete information about the hair cut to be done.

Figure 9:
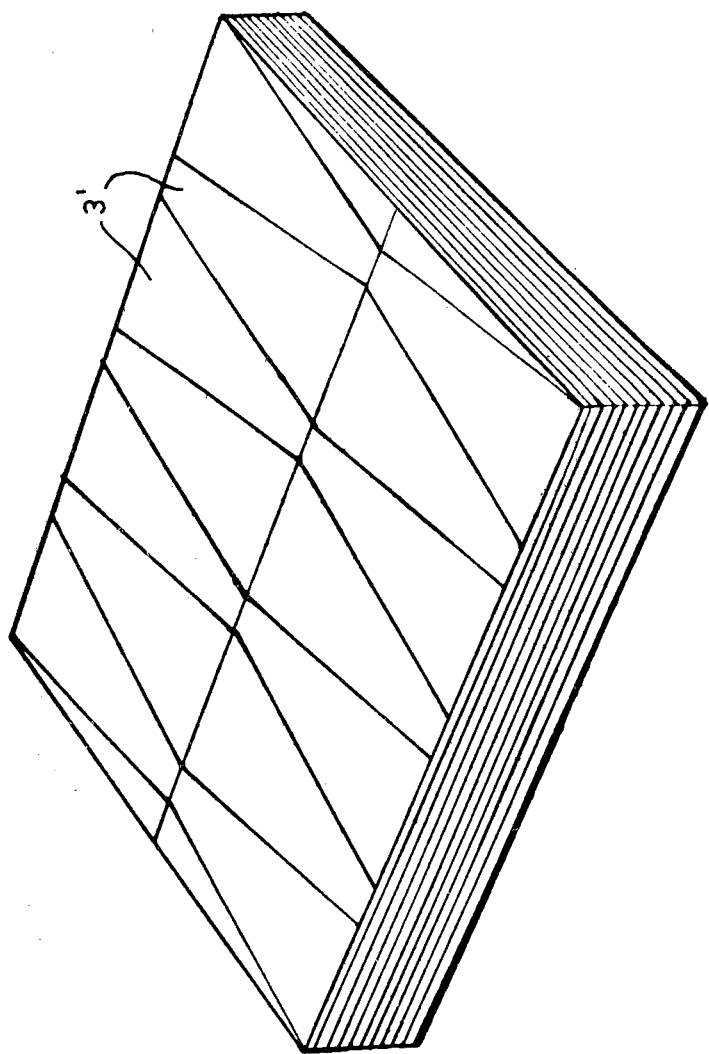
FIG. 9 is a perspective view of a stack of sheets to be used for obtaining pattern elements according to the invention.

The flag-shaped sheet portions 3' of the pattern elements 3 may be manufactured out of thin foam polystyrene sheet material. FIG. 9 illustrates a stack of sheets of such material which may be utilized by a user for preparing sheet portions 3' which are thereafter cut to a predetermined length and shape and inserted into the support portions 5 to form the pattern elements 3.

FIG. 3 illustrates another embodiment of the pattern elements which are here designated as 7. Cylindrical pattern elements or curling pins 7 or 8 (in FIG. 5) which are arranged on the head model 1 serve for the demonstration of a predetermined hair-setting technique. The larger pattern elements 7 correspond to curlers utilized for a water hair-wave whereas the smaller cylindrical pattern elements 8 correspond to curlers utilized for a permanent wave. The cylindrical pattern elements 7, 8 are each provided with a strip-like pad-like projection 9 (FIGS. 4a, 4b and 5). The projection 9 depicted in FIG. 4a extends over the front surface of the element 7 whereas the projection 9 shown in FIG. 4b extends only along the cylindrical surface of the pattern element 7. The pattern elements 7 and 8 are each provided with a marking surface 10 extending in a circumferential direction on the outer surface of the element and carrying a curved arrow 11 indicating the direction of winding of a curler.

The cylindrical pattern elements 7 are hollow and formed with perforations or holes 12 arranged in rows. A marking needle 13 shown in FIG. 7b is normally inserted through two opposite holes 12 so as to indicate certain directions of the pattern elements 7 on the head model 1, which are defined by a predetermined coiffure to be carried out; these directions should correspond to the arrangements of corresponding curlers to be used in hair-setting, which curlers may be wound at obtuse, or right, or acute angle to the surface of the head.

FIG. 7 illustrates three modifications of a wedge-shaped intermediate element 14 which has two flat surfaces 15 and 16 angularly positioned with one another. The surface 15 is an adhering surface which may be similar to that of strips 2 and surface 16 is of a pad-like material. The intermediate elements 14 may preferably be attached to the head model so that the pad-like surfaces 16 thereof will be connected to the strips 2. The adhering surface 15 of the elements 14 in turn will be attached to the pad-like projections 9 of the pattern elements 7 or 8. Such an arrangement will provide a user with the clear demonstration of exact arrangement of curlers to be used for a predetermined hair-setting.

The pad-like projection 9 illustrated in FIG. 4a and extending over the front surface of the pattern element 7 serves for demonstrating of possible hair-winding process which takes place in the water wave.

FIG. 8 depicts a modification of a pattern element which is made in the form of a papillote 17 provided with a pad-like strip 9. Papillotes or curlpapers may be specifically used in the area of the neck.

Referring back to FIGS. 1 and 2 it is to be recognized that the adhering or burdock-like strips 2 are applied to the head model which strips are arranged in two opposite rows extending traversal from a center or middle line of the head model 1, further rows of strips extend along the lower peripheral surface of the hair-indicating area in a circumferential direction.

The strips 2 may be provided with marking strips 18 shown in FIG. 1, which may be used for marking certain areas of the head model and may correspond to a a bone atlas; they may be placed in the middle of the band 2, or extend to the right or to the left from the center line of the model. The surface 2 may also be provided with a coordinate scheme.

For carrying out of a certain coiffure the corresponding pattern elements 3, 7, 8, 17 are applied to the corresponding areas of the head model 1. The flag-shaped sheet portions of the model elements 3 are preliminary cut to a predetermined length and shape in accordance with a certain style of a hair-cut, and then they are placed onto the head model 1 by means of support portions 5 at the regions of the band 2 defined by coordinates of the coordinate scheme.

It will be understood that each of the elements described above, or two or more together, may also find a useful application in other types of demonstration head models differing from the types described above.

While the invention has been illustrated and described as embodied in a demonstration head model, it is not intended to be limited to the details shown, since variour modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A demonstration head model for coiffures, comprising a body having a hair-indicating surface, an adhering means extending over said surface and engaged therewith, said hair-indicating surface having a middle line, said adhering means being arranged in rows of strips, two rows of said strips extending transverse of said middle line and away therefrom, at least a number of said rows extending along a lower edge of said hair-indicating surface and in a circumferential direction approximately corresponding to the circumference of the head model; and a plurality of pattern elements corresponding to hair locks to be cut and/or set, said pattern elements including pad-like projections which engage with said strips to thereby secure said pattern elements on said head model body.

2. The head model of claim 1, wherein each of said pattern elements includes a sheet portion and a supporting portion provided with said pad-like projection.

3. The head model of claim 2, wherein said supporting portion includes a support for holding said sheet portion and a spherically-shaped part carrying said pad-like projection.

4. The head model of claim 3, wherein said sheet portion has an end positioned in said support.

5. The head model of claim 4, wherein said sheet portion is interchangeable.

6. The head model of claim 5, wherein said support is formed with a slot, said sheet portion being insertable into said slot.

7. The head model of claim 2, wherein said sheet portion is made of foam sheet material.

8. The head model of claim 7, wherein said material is polystyrene foam sheet material.

9. The head model of claim 1, wherein said pattern element includes a cylindrical body having an outer surface, said outer surface carrying said pad-like projection.

10. The head model of claim 9, wherein said cylindrical body is provided with a marking surface arranged on the periphery of said body and extending transverse of said pad-like projection.

11. The head model of claim 9, wherein said cylindrical body is hollow and provided with a plurality of holes distributed over the periphery thereof.

12. The head model of claim 11, wherein said pattern element is provided with a marking needle insertable through said holes.

13. The head model of claim 9, further including a plurality of intermediate elements to be positioned between said strips and said pattern elements.

14. The head model of claim 13, wherein each of said intermediate elements is a wedge-like piece including an adhering surface and a pad-like surface, said adhering surface being angularly positioned to said pad-like surface.

* * * * *